April 2, 1940.   H. P. COATS   2,196,058
METHOD OF AND APPARATUS FOR POLISHING CONTAINERS
Filed Aug. 10, 1938
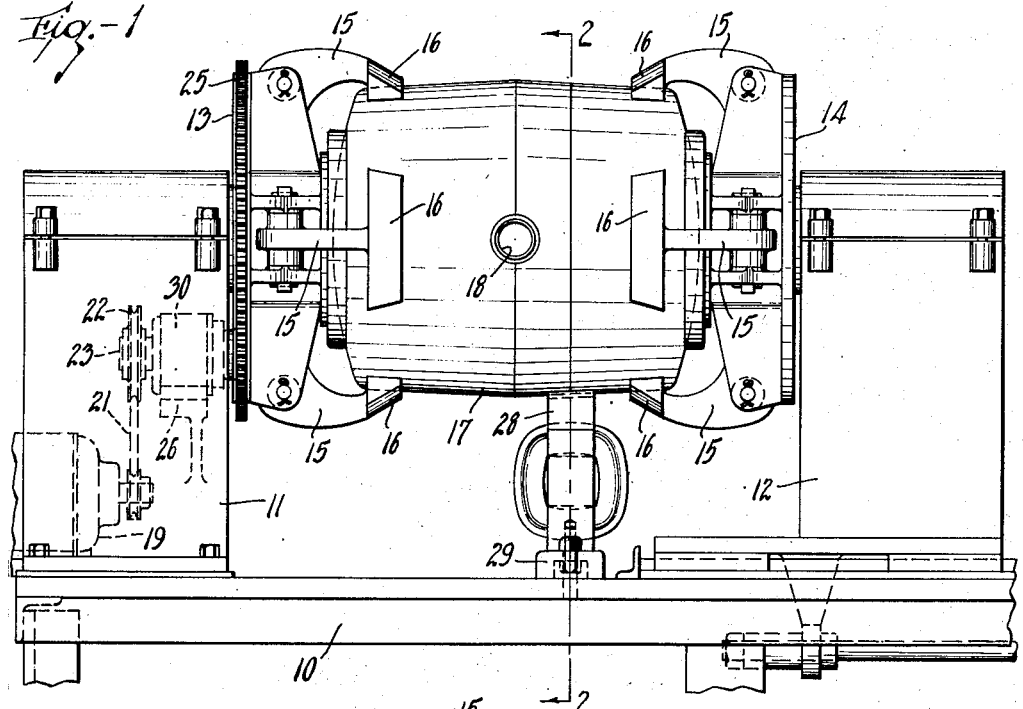
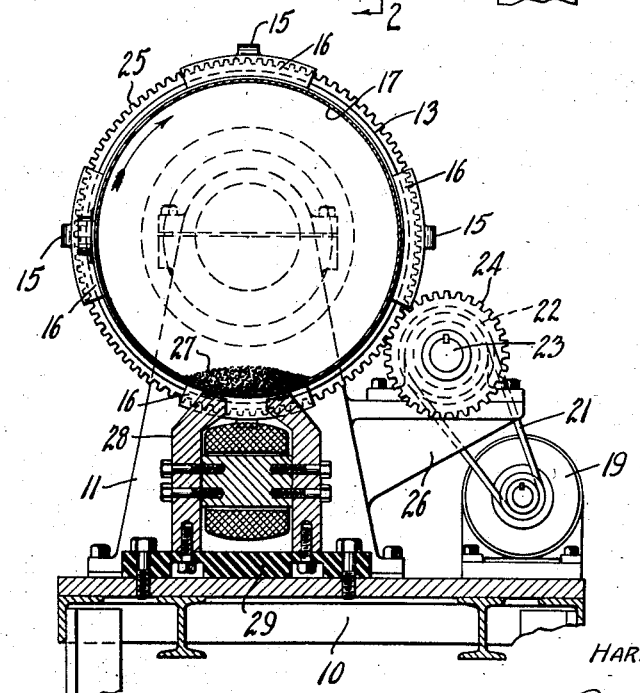
INVENTOR
HARRY P. COATS
BY
ATTORNEYS Patented Apr. 2, 1940

2,196,058

UNITED STATES PATENT OFFICE 2,196,058

METHOD OF AND APPARATUS FOR POLISHING CONTAINERS

Harry P. Coats, Akron, Ohio, assignor to The Firestone Tire & Rubber Company, Akron, Ohio, a corporation of Ohio Application August 10, 1938, Serial No. 224,106

8 Claims. (Cl. 51—2)

This invention relates to containers, more especially to methods of and apparatus for cleaning, or polishing the interior of barrel shells, barrel linings, drums, or the like.

Usually barrel shells are formed from two sections, each comprising a portion of the side and one end, or head of the structure to be formed. These sections are welded together in any suitable manner to form the completed structure, the weld either extending through the shell or else heating a portion of the inner surface of the shell to a high temperature. This produces scale, or oxide on the inner surface of the weld or shell, which scale is objectionable, particularly where edible material is to be carried in the barrel shell.

One main object of this invention is to provide an easily practiced method for cleaning the inner surface of containers while at the same time insuring a positive and thorough cleaning action. Other objects will be manifest from the specification.

The present invention, broadly speaking, comprises mounting an assembled barrel shell, which has been welded together from two semi-shell sections of non-magnetic material, for rotation and then rotating the same. A quantity of magnetic abrasive material is associated with the inner surface of the barrel shell and electro-magnetic means are provided to draw the abrasive material against the welded seam of the barrel shell and cause repeated contact between the abrasive material and the surface of the welded seam due to rotation of the barrel shell.

In the accompanying drawing;

Figure 1 is an elevation of one embodiment of apparatus for practicing the invention; and Figure 2 is a vertical section taken on line 2—2 of Figure 1.

Referring specifically to the drawing, a frame 10 is provided which supports a fixed housing 11 at one end thereof and which supports a movable housing 12 adjacent its other end. A rotatable head 13 is journalled in the fixed housing 11, while a similar rotatable head 14 is journalled in the movable housing 12. The rotatable heads 13 and 14 are each provided with an annular series of arms 15 that extend around the heads. The arms 15 are pivotally carried by the heads 13 and 14 and are provided with pads 16 at their free end, the pads being adapted to engage with, and the arms 15 support, containers, such as a barrel shell 17. The arms 15 are disposed concentrically with relation to the axis of the heads 13 and 14. Suitable means (not shown) retain the arms 15 in engagement with the barrel shell 17. The barrel shell 17 is made from a non-magnetic material, for example, stainless steel, and is of the type which is formed from two sections that are united by a circumferentially extending welded seam. At least one hole 18 is present in the assembled barrel shell.

In order to rotate the barrel shell, suitable driving means, such as electric motor 19 may be associated with the frame 10. The motor 19 drives a belt 21 which engages with a pulley 22 upon a shaft 23. The shaft 23 also carries a pinion gear 24 that engages with a ring gear 25 formed on the head 13. Thus rotation of motor 19 serves to rotate the barrel shell in the desired manner. The shaft 23 is journalled in a housing 30 that is carried by a bracket 26 formed on the housing 11.

Figure 2 shows that a mass of small, magnetic abrasive particles 27 are associated with the inner surface of the barrel shell 17. These particles are made from a hard abrasive material, and preferably comprise sharp pointed steel particles. These magnetic abrasive particles 27 are drawn against the inner surface of the circumferentially extending welded seam of the barrel shell 17 by an electro-magnet 28 that is positioned immediately adjacent a portion of the outer surface of the barrel shell in the plane of the welded seam. The electro-magnet 28 is mounted upon an insulating base 29, secured to the frame 10, and is provided with electric power from any suitable source, not shown. The electro-magnet 28 is of standard construction and in one instance in which satisfactory results were secured, the electro-magnet produced a surface pull of substantially 50 pounds per square inch. This force serves to draw the magnetic abrasive particles 27 tightly against the surface of the circumferential weld in the barrel shell. The abrasive particles are retained in the plane of the weld and adjacent the electro-magnet 28 due to the force exerted thereby, and the abrasive particles repeatedly are drawn from one portion of the welded seam to another as the barrel shell is rotated. This repeated contacting of the weld by the numerous small abrasive particles serves to clean, or polish, the scale or oxide from the surface of the weld.

A feature of using pointed abrasive particles is that the electro-magnetic force acts to draw the points of these particles towards the electro-magnet and this secures a more effective abrasive action between the particles and the inner surface of the barrel shell.

It will be observed that the abrasive particles 27 can be removed from the barrel shell through the hole 18 after the weld has been polished and that these particles may be used to polish innumerable containers. While the invention is disclosed with reference to polishing the inner surface of the welded seam of a barrel shell on the inner surface of the shell in the plane of an external weld, it is evident that the invention may be used to polish the entire interior surface of any non-magnetic container. A thorough polishing action is insured by positively drawing the abrasive particles against the surface to be treated.

In accordance with the patent statutes, I have illustrated and described the structure and mode of operation of an embodiment of the invention. However, it will be understood that various modifications can be made without departing from the scope of the invention as defined in the appended claims.

What is claimed is:

1. That method of cleaning the inner surface of a circumferential weld in non-magnetic containers comprising mounting the container for rotation around the axis of the circumferential weld, placing a large number of small sharp magnetic abrasive particles inside the container, rotating the container around the axis of the weld applying a stationary electro-margnetic force to a portion of the outside surface of the container in the plane of the weld to draw the abrasive particles tightly against the inner surface of the weld, and holding the abrasive particles adjacent the source of the electromotive force while rotating the container whereby the abrasive particles are drawn tightly against the circumferential weld which moves relative to the abrasive particles.

2. That method of cleaning the inner surface of a circumferential weld securing segments of non-magnetic containers together comprising mounting the container for rotation around the axis of the circumferential weld, placing a large number of small magnetic abrasive particles inside the container, rotating the container around the axis of the weld and applying a stationary electro-magnetic force to a portion of the outside surface of the container in the plane of the weld to draw the abrasive particles tightly against the inner surface of the weld, whereby the abrasive particles are held in substantially fixed position adjacent the electro-magnet and are repeatedly brought into contact with a different portion of the circumferential weld due to rotation of the container.

3. That method of cleaning the inner surface of a circumferential weld in non-magnetic containers comprising rotating the container, and applying a stationarily positioned electromotive force from the outside of the container to a portion of the container intermediate the ends thereof in the plane of the weld, placing magnetic abrasive particles in the container before rotating same, said particles being held against the surface of and move relative to the circumferential weld due to the electromotive force thereon and to the rotational movement of the container.

4. That method of polishing the inner surface of non-magnetic containers comprising mounting the container for rotation, rotating the container, placing a large number of small sharp magnetic abrasive particles inside the container, and applying a stationary electro-magnetic force to the outside surface of the container intermediate the ends thereof to draw the sharp portions of the abrasive particles against the inner surface of the container and hold the abrasive particles adjacent the source of the electromotive force whereby the abrasive particles repeatedly contact the inner surface of the container due to the rotation thereof.

5. That method of cleaning the inside surface of non-magnetic containers comprising placing abrasive magnetic material inside the container, drawing the magnetic material tightly against the inside surface of the container by an electromagnetic force, and moving the container relative to the electro-magnetic force which retains the abrasive magnetic material adjacent the source of such force to provide relative movement between the container and the abrasive magnetic particles.

6. That method of cleaning the inside surface of non-magnetic containers comprising mounting the container for rotational movement about its longitudinal axis, placing a large number of small magnetic abrasive particles in the container, applying a stationary electro-magnetic force to a portion of the outer surface of the container intermediate the ends thereof, and rotating the container through a fixed path whereby relative movement between the container and the abrasive particles is secured.

7. Apparatus for cleaning the inner surface of a substantially closed non-magnetic container having end heads comprising means for engaging with both ends of a container to position same for axial rotation, driving means engaging with said means to rotate a mounted container, magnetic abrasive particles loosely positioned on the inner surface of the mounted container, and electro-magnetic means positioned intermediate the ends of the container to draw said magnetic abrasive particles thereagainst, whereby rotation of the container produces relative rotation between said abrasive particles and the inner surface of the container to clean the surfaces of same.

8. Apparatus for cleaning the inner surface of a substantially closed non-magnetic container comprising means engaging with both ends of a container to position same for axial rotation, driving means engaging with said means to rotate the mounted container, magnetic abrasive particles loosely positioned in the mounted container on the inner surface thereof, and electro-magnetic means fixedly mounted adjacent the periphery of the container intermediate the ends thereof to pull said magnetic abrasive particles against the surface of the container and retain them adjacent the electro-magnetic mean whereby rotation of the container produces relative rotation between said abrasive particles a· the inner surface of the container to clean the surfaces of same.

HARRY P. COATS.